J. G. BECKER.
HOMOGENIZER.
APPLICATION FILED OCT. 23, 1911.
1,070,226.
Patented Aug. 12, 1913.
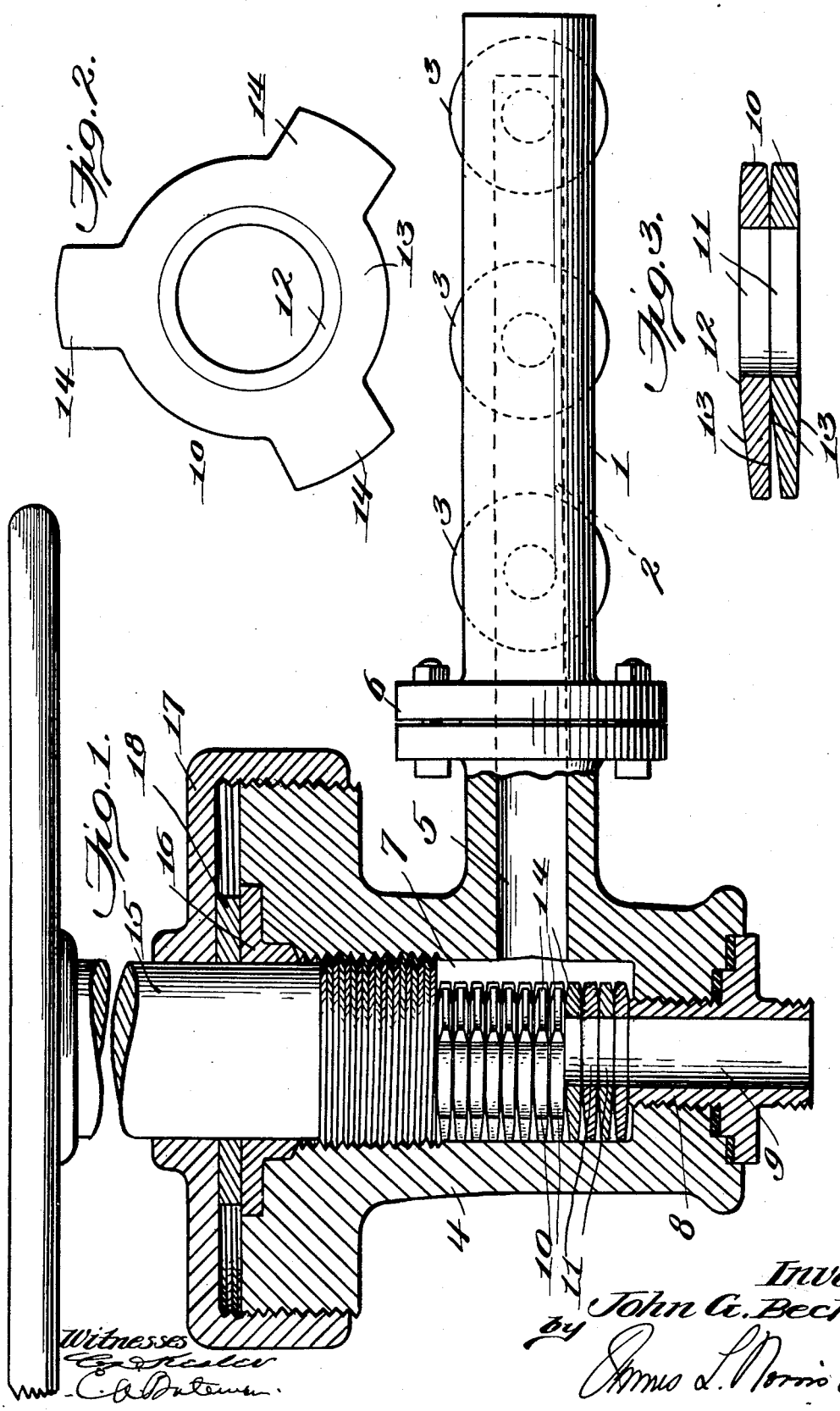

UNITED STATES PATENT OFFICE.

JOHN G. BECKER, OF MILWAUKEE, WISCONSIN, ASSIGNOR, BY MESNE ASSIGNMENTS, TO DAIRY MACHINERY AND CONSTRUCTION COMPANY, INCORPORATED, OF DERBY, CONNECTICUT, A CORPORATION OF CONNECTICUT.

HOMOGENIZER.

1,070,226.      Specification of Letters Patent.      Patented Aug. 12, 1913.

Application filed October 23, 1911. Serial No. 656,297.

*To all whom it may concern:*

Be it known that I, JOHN G. BECKER, a citizen of the United States, residing at Milwaukee, in the county of Milwaukee and State of Wisconsin, have invented new and useful Improvements in Homogenizers, of which the following is a specification.

The present invention relates to improvements in apparatus for homogenizing liquids such as milk and cream whereby the constituents thereof are rendered homogeneous, and the primary object of the present invention is to provide means whereby the fatty and watery constituents of such a liquid may be made homogeneous without, however, altering or affecting the casein in such a way as to cause it to curdle or rise to the surface when the homogenized product is used in hot coffee or other hot liquids, homogenization being effected, according to the present invention, by forcing the liquid to be homogenized in the form of numerous thin layers between disks having homogenizing surfaces of very small surface area, the product being thoroughly homogenized, but the casein in the liquid is acted on by these small surfaces for such a short length of time that it will remain unaltered or in its natural state.

In the accompanying drawing:—Figure 1 is a view partly in section of one form of homogenizing apparatus embodying the present invention; Fig. 2 is a plan view of one of the homogenizing disks; and Fig. 3 represents a diametrical section through two homogenizing disks placed in superposed relation.

Similar parts are designated by the same reference characters in the several views.

The present invention is applicable to homogenizing apparatus of different kinds, it being shown for example in the accompanying drawing as applied to homogenizing apparatus of the type disclosed in Letters Patent, No. 973,228 granted October 18, 1910 to Joseph Willmann. It will be understood, however, that these improvements are not limited to homogenizing apparatus of this specific type. In the present instance the apparatus comprises a pressure chamber 1 formed with a conduit or passage 2 which receives the liquid which is pumped therein by a suitable number of pumps 3, these pumps being preferably of a number that will produce and maintain practically uniform pressure and rate of flow of the liquid.

The homogenizing device comprises a casing 4 which has an inlet passage 5 which is connected to receive liquid from the conduit or passage 2 of the pressure chamber, the casing 4 being suitably connected to the delivery end of the pressure chamber as, for example, by a flange coupling 6. The casing 4 is formed with a homogenizing chamber 7 which communicates with and receives the liquid from the inlet passage 5. A seat is provided at the bottom of the homogenizing chamber 7, this seat being preferably in the form of a bushing 8 which is threaded into the bottom of the casing 4 in alinement with the axis of the chamber 7, this bushing 8 having an outlet passage 9 for the homogenized product and the homogenized product may be discharged into a pipe attached to the exterior of the bushing.

The homogenizing disks 10 embodying the present invention are contained in the homogenizing chamber 7 and in the present instance they are superposed one upon another to form a stack or pile, the lowermost disk resting upon the inner or upper end of the bushing 8 as a seat and having preferably a ground fit therewith. Each homogenizing disk according to the present invention is formed with a central or interior opening 11 and this opening is surrounded on one or both sides of the disk with a homogenizing surface 12 of relatively small area or radial dimension, the face or faces of each disk being sloped or cut away exteriorly of or beyond the homogenizing surface 12 to form a clearance 13 whereby the liquid will be fed freely and uniformly to the opposed homogenizing surfaces of the assembled disks. Preferably, the homogenizing surfaces 12 are formed on both sides of each disk and both sides of each disk are formed with the clearance surfaces 13. Each disk also is provided in the present instance with circumferentially spaced lugs 14 which are adapted to coöperate with the walls of the homogenizing chamber 7 and thereby properly center the disks therein. When the disks are assembled, the homogenizing surface 12 of limited area on one side of the disk will be exactly superposed upon a complemental homogenizing surface of equal area upon the adjacent disk and the clearance surfaces between the disks form annular spaces whereby the liquid may be fed freely and uniformly to the homogenizing surfaces throughout their circumferences. In the present instance each homogenizing surface 12 is a plane surface of annular form and of very small radial dimensions while the clearance surfaces 13 are frusto-conical in form. The homogenizing surfaces are formed preferably by grinding in order that they will fit as accurately as possible against one another.

In operation the liquid to be homogenized is forced at high pressure and in the form of numerous thin layers between the opposed homogenizing surfaces 12 of the assembled disks, these homogenizing surfaces being spaced apart a distance sufficient to permit the passage of the flowing body of liquid and to maintain such liquid at a proper homogenizing pressure. In the present instance, I have shown means whereby the homogenizing surfaces of the disks will be firmly and positively held from separating beyond a fixed or constant distance from one another under the pressure influence of liquid, such means comprising a screw plunger 15 which is threaded directly into the upper portion of the casing 4 and this screw bears upon the uppermost disk, the screw being operated to press upon the assembled disks and to positively withstand the hydraulic pressure of the liquid whereby a space of the proper dimensions will be maintained between the opposed homogenizing surfaces of the disks. A high pressure packing 16 is provided to prevent leakage of the liquid at high pressure around the screw and this packing is compressed to the proper degree by a cap 17 which is threaded upon the casing and has a flange or collar 18 which bears upon and compresses the packing. It is to be understood, however, that different means may be employed to act upon and compress the disks whereby the homogenizing surfaces thereof will be coöperatively related during the homogenizing operation. Obviously, the number of disks or homogenizing surfaces may be varied according to the capacity of the machine, or to meet other conditions or requirements in the operation thereof. According to the present invention, a flowing body of the substance to be homogenized, such as milk and cream, is subdivided into a plurality of streams in the form of thin layers or films, and each layer or film passes so quickly between the respective homogenizing surfaces owing to their short radial extent that there is no opportunity for the casein to become altered, and hence, the casein will remain in its natural state and when the milk and cream containing casein is used in hot coffee or other hot liquids, such casein will not curdle or rise to the surface of such liquid.

I claim as my invention:—

1. In homogenizing apparatus, the combination of a plurality of disks having the marginal portions of their faces beveled and formed with smooth opposed homogenizing surfaces of annular form and small radial dimensions, means for holding such homogenizing surfaces in operative position, and means for forcing the liquid to be homogenized past said homogenizing surfaces.

2. In homogenizing apparatus, the combination of a plurality of assembled disks having portions of their faces beveled and other portions thereof forming opposed homogenizing surfaces of annular form and small radial dimensions, pressure means operative upon the assembled disks to hold the homogenizing surfaces thereof in coöperative relation, and means for forcing the liquid to be homogenized between said homogenizing surfaces.

3. In homogenizing apparatus, the combination of a set of assembled disks having the marginal portions of their opposed faces beveled and formed with smooth annular homogenizing surfaces of small radial dimensions arranged in opposed relation and forming a sloping circumferential clearance space leading to and surrounding said homogenizing surfaces, means for holding said homogenizing surfaces in coöperative relation, and means for feeding the liquid to be homogenized to said clearance space and forcing such liquid between said homogenizing surfaces.

4. In a homogenizer, means embodying a stack of disks having portions of their faces beveled circumferentially and other portions of their faces parallel for subdividing the liquid to be treated into fine layers and subjecting such layers to a homogenizing action for such a short distance in the travel of said layers that in treating milk or cream the condition of the casein is not changed.

5. In homogenizing apparatus, the combination of coöperative disks each having an internal aperture extending therethrough and having portions of its faces beveled and formed with smooth annular homogenizing surfaces of small radial dimension surrounding said aperture, the opposed faces exteriorly of said homogenizing surfaces being convergent to form a clearance space surrounding such surfaces, means for holding said disks in coöperative relation, and means for forcing the liquid to be homogenized between said homogenizing surfaces.

6. In homogenizing apparatus, the combination of coöperative disks each having an internal aperture extending therethrough and having portions of its faces beveled and formed with smooth plane homogenizing surfaces of annular form and small radial dimension surrounding said aperture therein, the face of the disk surrounding said homogenizing surface being tapered, means for holding the disks together with the homogenizing surfaces thereof in coöperative relation, and means for forcing the liquid to be homogenized between such homogenizing surfaces.

7. In apparatus for homogenizing milk and cream, the combination of a casing containing a chamber having means for supplying the milk and cream to be homogenized thereto, a plurality of disks assembled in said chamber, portions of the faces of said disks being beveled and forming smooth homogenizing surfaces and converging clearance spaces leading thereto, and means operative upon the disks to hold the homogenizing surfaces thereof in coöperative relation whereby the liquid to be homogenized is subdivided into a plurality of layers or films and passes so quickly between said homogenizing surfaces as to avoid alteration of the casein.

In testimony whereof I have hereunto set my hand in presence of two subscribing witnesses.

JOHN G. BECKER.

Witnesses:
 FLORENCE RIEMANN,
 JOSEPH WILLMANN.